United States Patent [19]

Schrott et al.

[11] Patent Number: 5,552,778
[45] Date of Patent: Sep. 3, 1996

[54] MULTIBIT BIMORPH MAGNETIC TAGS USING ACOUSTIC OR MAGNETIC INTERROGATION FOR IDENTIFICATION OF AN OBJECT COUPLED THERETO

[75] Inventors: Alejandro G. Schrott; Robert J. von Gutfeld, both of New York, N.Y.

[73] Assignee: International Business Machines Corporation, Armonk, N.Y.

[21] Appl. No.: 344,771

[22] Filed: Nov. 23, 1994

[51] Int. Cl.⁶ .................................................. H04B 1/59
[52] U.S. Cl. ....................... 340/825.340; 340/825.54; 340/551; 340/552; 340/572; 324/207.21; 324/252
[58] Field of Search ................ 73/649, 651; 235/380, 235/385, 449, 493; 340/505, 551, 572, 825.34, 825.54; 324/207.13, 207.21, 213, 214, 215, 252, 76, 201, 260; 342/51; 338/22

[56] References Cited

U.S. PATENT DOCUMENTS

| | | | |
|---|---|---|---|
| 3,755,803 | 8/1973 | Cole et al. | 340/552 |
| 4,079,360 | 3/1978 | Ookubo et al. | 324/252 |
| 4,341,189 | 7/1982 | Yamaguchi et al. | 123/425 |
| 4,447,781 | 5/1984 | Van Dyke | 324/252 |
| 4,465,047 | 8/1984 | Yamaguchi et al. | 123/425 |
| 4,476,454 | 10/1984 | Aboaf et al. | 324/252 |
| 4,510,490 | 4/1985 | Anderson, III et al. | 340/572 |
| 4,647,917 | 3/1987 | Anderson, III et al. | 340/572 |
| 4,940,966 | 7/1990 | Pettigrew et al. | 340/551 |
| 4,999,609 | 3/1991 | Crossfield | 340/572 |
| 5,001,458 | 3/1991 | Tyrén et al. | 340/551 |
| 5,001,933 | 3/1991 | Brand | 73/651 |
| 5,038,130 | 8/1991 | Eck et al. | 324/207.21 |
| 5,055,786 | 10/1991 | Wakatsuki et al. | 324/252 |
| 5,166,612 | 11/1992 | Murdock | 324/207.13 |
| 5,341,118 | 8/1994 | Parkin et al. | 324/252 |
| 5,420,569 | 5/1995 | Dames et al. | 340/572 |

FOREIGN PATENT DOCUMENTS

| | | | |
|---|---|---|---|
| 4338554 | 5/1994 | Germany | 340/572 |
| 2101455 | 1/1983 | United Kingdom | 340/572 |

OTHER PUBLICATIONS

NL 8903–220–A (91–228416/31) Derwent Publications Ltd. London, England; 1991. "EM mechanical, resonator detecting shop lifter—vibrates audibly when exposed to magnetic field". [abstract].

T. Klinger et al.; "Magnetostrictive Amorphous Sensor for Biomedical Monitoring"; IEEE Transactions on Magnetics, vol. 28, No. 5, Sep. 1992; pp. 2400–2402.

IBM Technical Disclosure Bulletin, "Speech coder utilizing semiconductor cantilevers", Jan. 1968, vol. 10, No. 8, p. 1259.

Primary Examiner—Brian Zimmerman
Assistant Examiner—William H. Wilson, Jr.
Attorney, Agent, or Firm—Whitham, Curtis, Whitham & McGinn; Stephen S. Strunck, Esq.

[57] ABSTRACT

A tag structure suitable for attachment to an object includes one or more bimorphs comprised of a thin strip of a magnetostrictive material attached to a thicker bar of hard magnetic material. The tag is preferably excited using either magnetic or acoustic fields, tuned to the resonance of the bimorphs. The excitation induces strain in the bimorph which causes mechanical vibrations in the bimorph which are sensed acoustically or magnetically, giving rise to a code. A device for detecting the output of the tag is provided along with a device for decoding the output from the detecting means thereby to identify the object.

16 Claims, 3 Drawing Sheets

MULTIBIT BIMORPH MAGNETIC TAGS USING ACOUSTIC OR MAGNETIC INTERROGATION FOR IDENTIFICATION OF AN OBJECT COUPLED THERETO

BACKGROUND OF THE INVENTION

1. Field of the Invention

The present invention generally relates to a multibit tag useful for object identification having an array of cantilevers, and more particularly to a tag having a novel form of cantilever preferably fabricated from a thin strip of magnetostrictive material such as certain Metglas™ compositions or the like preferably attached to a thicker bar of hard magnetic material to form a bimorph.

Further, the present invention relates to tags that use magnetic or acoustic excitation in conjunction with one or more bimorphs of magnetostrictive material attached to thicker bars of hard magnetic material having both ends unclamped or having both ends clamped.

2. Cross-reference to Related Applications

The invention disclosed and claimed herein is related to the inventions disclosed and claimed in co-pending applications Ser. Nos. 08/344,805, 08/344,808, 08/344,196, and 08/344,296.

DESCRIPTION OF THE RELATED ART

For retail tagging, tagging used in the road/air-freight package industry, and pallet tagging in manufacturing processes, a tag is useful for identifying a product in detail. With a sufficient number of bits, the tag can be interrogated to determine what the product is, when it was manufactured, its price, whether the product has been properly passed through a check-out counter or kiosk, etc. Tags are also useful in identifying personnel as well as a variety of other animate and inanimate objects.

Thus, tags are useful in retailing, shipping, manufacturing and many other kinds of businesses. A number of different magnetic tag configurations are presently of interest for inventory, theft control and personnel identification. Acoustic excitation is attractive as it tends to be less directional than electromagnetic excitation used conventionally. Many conventional sensors also require power sources as pan of the structure and some operate only at low temperatures.

In one conventional tag, a vibration sensor includes one or more cantilevers tuned to resonate at predetermined frequencies. The cantilever vibration causes a gap to be closed which allows current to flow through the cantilever to a microchip and an integrated circuit mounted on the base of the device. Thus, this device requires a power source, wiring, current flow through the device for sensing and an integrated circuit, all of which are part of the tag structure.

Another conventional tag has a plurality of cantilevers, with each cantilever having its own superconducting quantum interference device (SQUID) detector mounted in close proximity to a miniature cantilever. Current must flow through the cantilever. The current supplies the magnetic field which results in a change in flux when the cantilever vibrates. The SQUIDS necessarily make this a low temperature device, i.e. at least as low as liquid nitrogen, though more likely liquid Helium (4 degrees Kelvin). This device does not provide for remote sensing and furthermore requires an onboard power source. Additionally, sensing coils on the device operate only at low temperatures.

Other sensing elements are known in which engine knocking is detected with a feedback mechanism for adjusting the timing to reduce the knocking. Vibrating cantilever elements are used which are either magnetic or piezoelectric. Sensing for the piezoelectric elements is obtained by a current output at the resonant frequency. With the magnetic elements, a change in the reluctance path is detected by a coil wrapped around the core of the magnetic circuit comprising the device. Sensing is part of the device and is not achieved remotely. The excitation is mechanical vibration leading to cantilever resonance since the device is secured to the engine block.

Additionally, a single "bit" resonator is known in which a resonating element is an integral part of the resonator structure, consisting of a magnetostrictive membrane. Magnetic excitation is required, giving rise to an acoustic signal that can be detected remotely.

SUMMARY OF THE INVENTION

It is therefore an object of the present invention to provide a multibit tag having an array of bimorph cantilevers.

Another object is to provide a novel form of cantilever fabricated from a thin strip of soft magnetostrictive material such as certain Metglas™ compositions, permalloy, or the like, attached to a bar of hard magnetic material to form a bimorph cantilever of the multibit tag.

Yet another object is to provide a tag which uses magnetic or acoustic excitation in conjunction with one or more bimorphs which are preferably clamped at first and second ends or having both ends free.

A further object of the present invention is to provide a system and method of using acoustic detection of such a magnetic multibit tag.

Yet another further object of the present invention is to provide a system and method of using magnetic detection of such a magnetic multibit tag.

In a first aspect of the invention, a magnetic tag for remote sensing is provided which includes at least one element or strip of a magnetostrictive material, said each at least one magnetostrictive strip being preferably attached to a support bar of hard magnetic material to form a bimorph for responding to resonances of said bar of hard magnetic material to produce unique time varying magnetic fields corresponding to the resonances, when excited by magnetic or acoustic excitation. Herein, the resonances are mechanical in nature and correspond to vibrational modes of the bar of hard magnetic material in a direction normal to the plane of the bimorph.

In a second aspect of the invention, a magnetic tag for remote sensing is provided which includes at least one strip of magnetostrictive material each at least one said magnetostrictive strip being attached preferably to a thicker bar of hard magnetic material to form a bimorph for responding to resonances of said hard magnetic material bar to produce unique time varying acoustic fields corresponding to said resonances, when excited by magnetic or acoustic excitation.

In a third aspect of the invention, a single or multibit magnetic tag is provided which includes at least one magnetostrictive strip attached to a bar of hard magnetic material forming a bimorph element, the at least one bimorph having first and second ends, with both first and second ends being free or at least one of the first and second ends being clamped to form an assembly wherein with one end clamped said element is a cantilever.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Generally, the present invention includes several concepts to yield several new types of magnetic single or multibit tags. As mentioned above, such tags are useful for inventory control, identification of objects, people, theft control, etc.

As discussed in further detail below, the device includes a bimorph cantilever fashioned from a thin piece of ferromagnetic material, with high magnetostriction known in the art as magnetostrictive materials, such as Metglas™ (e.g., 2605CO, an amorphous metal ribbon) which is commercially available from Allied Signal Corporation, attached to a piece of ferromagnetic material with high coercivity, known in the art as a hard magnetic material, to provide a bias field to the magnetostrictive strip.

Figure 1:
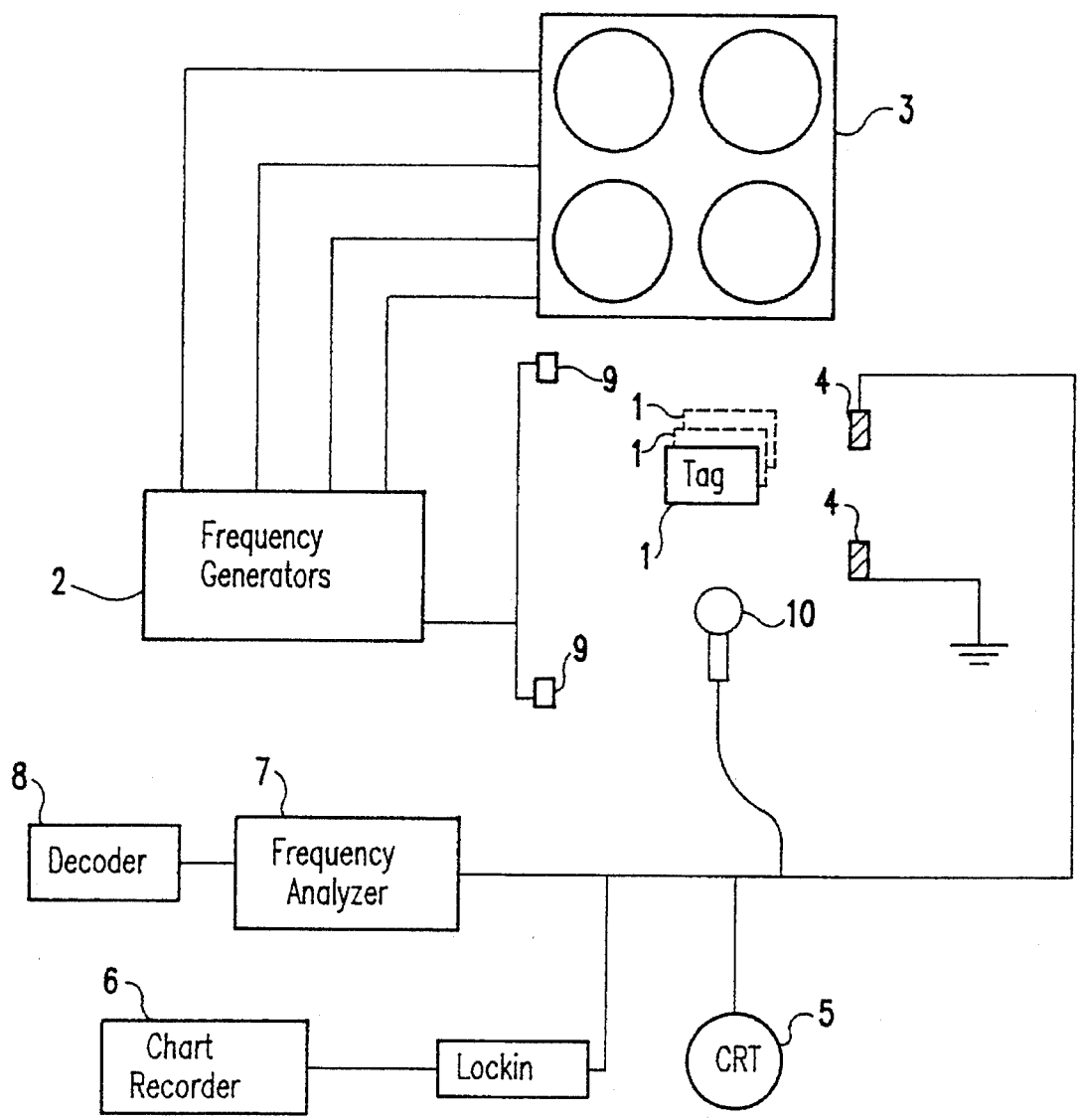
FIG. 1 is an exemplary detection/interrogation system employing the tag according to the present invention.

FIG. 1 illustrates an exemplary system in which the magnetic tag 1 of the invention is utilized. The system includes frequency generators 2 which may drive an array of speakers 3 or interrogation (excitation) coils 9 for generating predetermined acoustic or magnetic energy waves having a predetermined frequency. The energy is for interrogating the tag, typically affixed to an animate or inanimate object, by causing one or more bimorphs in the tag to begin resonating at their respective resonant frequencies. The output from the one or more bimorphs is received by a pickup (e.g., receiving) coil 4 or microphone 10. Thereafter, the output from coil 4 or microphone 10 is input to an output/display device such as a cathode ray tube (CRT) 5, a chart recorder 6 (via a lock-in device), a frequency analyzer 7, and/or a suitable decoding device 8. With the invention, based on the detected frequency code generated by the tag, decoding or interpretation of the code can be accomplished by the decoder 8. The structure of the decoder 8 is known in the an and includes, for example, an interface between the coil 4 and a suitable processor including such known circuitry as an A/D converter, suitable signal condition/processing circuitry, lookup tables and logic circuitry. Thus, a predetermined code encoded on the tag 1 can be detected and read out.

The basic operation of the tag relies on the time varying changes of permeability of the magnetostrictive material. In the presence of a sound field (acoustic excitation), the permeability change is caused by the strain imparted by the flexing vibration of the bimorph, which is caused by the time varying pressure field of the sound. The vibration of the hard magnetic bar becomes resonant at frequencies determined by its material properties, and dimensions, principally its length and thickness.

Under magnetic excitation, the time varying magnetic field produces a corresponding change in volume in the magnetostrictive strip. Because the strip is attached to the hard magnetic bar, the strain in the strip causes the entire bimorph to vibrate in a bending mode.

Figure 2A:
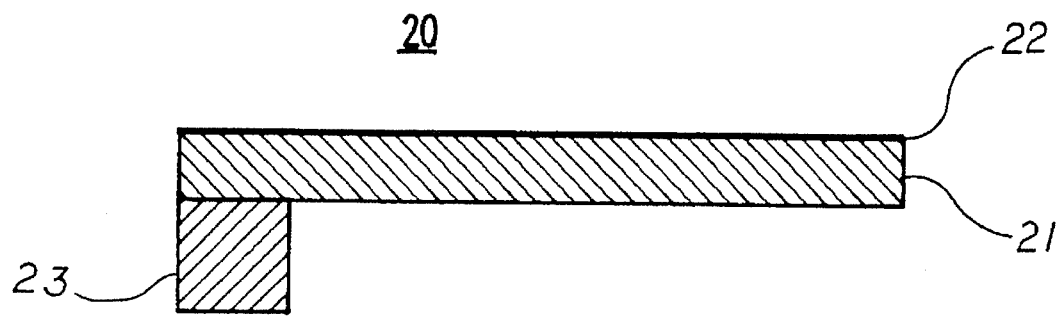
FIG. 2A illustrates a bimorph cantilever.

The structure of the tag is shown in greater detail in FIG. 2A, herein illustrated for a single bimorph cantilever 20. The bar of hard magnetic material 21 of the bimorph is chosen to resonate at a predetermined resonant frequency, said resonant frequency being that corresponding to said bar of hard magnet, which is by construction thicker than the magnetostrictive strip 22 of the bimorph. Bar 21 therefore determines the mechanical response of the bimorph. Any of a number of means may be used to attach magnetostrictive element 22 to bar 21 as by, for example, adhesively attaching the one to the other, or by depositing (e.g., sputtering, spraying) the magnetostrictive material onto the bar.

Figure 2B:
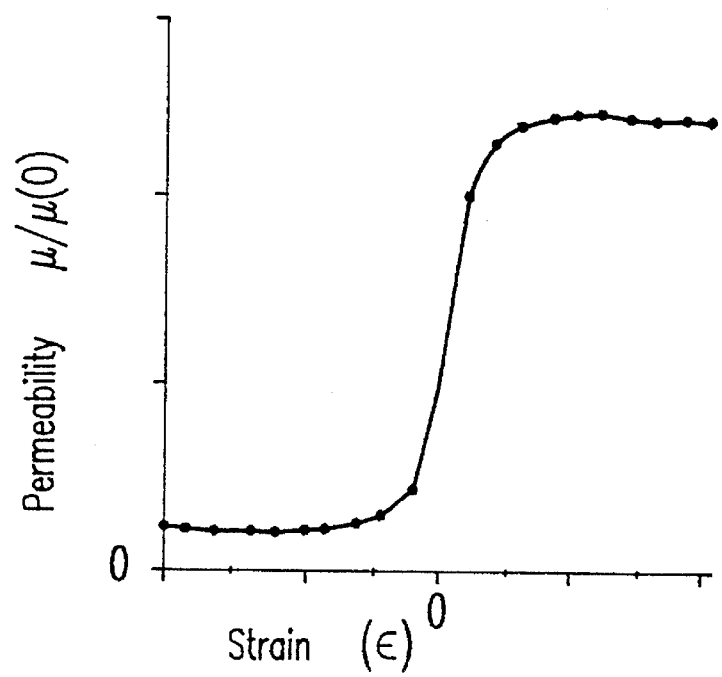
FIG. 2B illustrates a variation of the magnetic permeability with strain of the magnetostrictive strip of the bimorph of FIG. 2A.

FIG. 2A shows a preferred embodiment with the bimorph cantilever made with a hard magnet bar 21 and the magnetostrictive foil 22 having the same length and width as those of bar 21. The bimorph assembly works even if the bar is made of non-magnetic material when an external DC bias field is provided. The bimorph resonates at a frequency varying directly with the thickness of the bar 21 and inversely with its length squared. When the bimorph is set into mechanical vibration, bar 21 produces a time varying magnetic field (B) in the cantilever at the resonance frequency as a result of the change in permeability in the magnetostrictive part 22 of the bimorph. Typical variation of permeability with strain for a magnetostrictive material is shown in FIG. 2B. The net change in magnetic flux ($\phi$) with time, (t), d$\phi$/dt, is easily sensed by a pickup coil (e.g., coil 4 shown in FIG. 1). The magnetostrictive strip 22 should preferably have a predetermined size (e.g., 0.2–2 cm in length, 0.1–0.5 cm in width, approximately 1 mil thick) so that the magnetic moment of the strip does not become too small and hence unable to produce a detectable magnetic signal. The bar 21 of hard magnetic material of the bimorph cantilever should be several times (e.g. 5) thicker, for the same length, than the magnetostrictive strip, in order to have the bimorph vibrate at frequencies determined by the bar dimensions.

Conversely, in a time varying magnetic field, the time varying stress at the interface between components 21 and 22 of the bimorph 20 will cause a mechanical vibration of the bimorph.

in another embodiment of the present invention, the present inventors have found that the upper range of frequencies of the bimorph tag can be extended by utilizing different boundary conditions on a resonating bimorph compared to those imposed by a bimorph cantilever configuration. The solution to the differential equations for the fundamental resonant frequency of a thin strip (bar) clamped at both ends, such as in FIG. 3, or unclamped at both ends is identical and is approximately 6.4 times higher than that of a cantilever of equivalent length and equal thickness. In the unclamped case, the bar of hard magnetic material may be a free bar or may be loosely supported, for example by positioning its ends in grooves or slots in a simple support structure at each end.

Thus, with these boundary conditions, the structure will have frequencies that are readily moved to higher values; an advantage for use in any customer/retail environment. Simultaneously, relatively large lengths of the strips will ensure relatively large magnetic or acoustic output signals.

Figure 3:
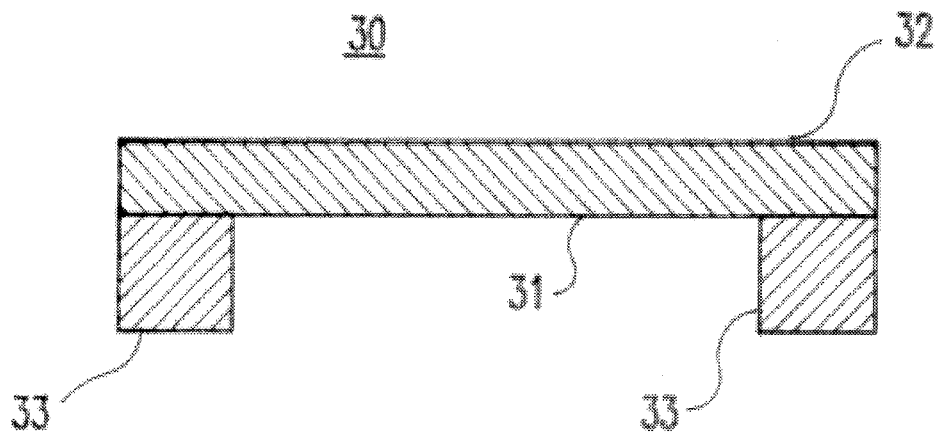
FIG. 3 illustrates a bimorph with two ends clamped.

The tag 30 according to this aspect of the invention is preferably constructed as shown in FIG. 3 for high frequency applications. For the sake of convenience, tag 30 is shown as a single bit. A bar of hard magnetic material 31, to which is attached to a strip of magnetostrictive strip 32, is clamped at both ends by two supports 33. For the unclamped embodiment, the said bimorph is held by the supports 33, but not clamped (i.e., mechanically attached) to them. This can also be effected by the use of slotted supports (not shown). Typical dimensions of the hard magnetic member of the bimorph (typically Fe or Co sheet) are 1 cm length, 3 mm width and 200 µm thickness. A plurality of parallel bimorphs arranged using any one of the aforementioned boundary conditions can be configured to provide a multiplicity of bits, each bimorph for a bar of a given material having a different length and/or thickness to provide a unique set of fundamental and overtone frequencies. Providing a plurality of bimorphs (or tags 1 shown in FIG. 1 with the phantom lines) is preferred so as to produce a multibit tag.

The entire assembly is preferably excited with sinusoidal magnetic waves from one or a set of coils, with the waves ranging in frequencies up to approximately 50 to 100 kHz and preferably in the range of 5–50 kHz. The upper frequency limit is due not primarily to the device, but by the ability of presently available microphones or suitable high frequency detectors.

With the invention, based on the detected frequency code generated by the tag, decoding or interpretation of the code can be accomplished by a suitable decoding device 8 as shown in FIG. 1 which is known in the art and which includes, for example, an interface between coil 4 or microphone 10 and a suitable processor including such known circuitry as an A/D converter, suitable signal conditioning/processing circuitry, lookup tables and logic circuitry.

In the case of a multibit tag, the tag can be programmed to generate a binary or other suitable code. In the binary code case, if a certain frequency of an array of cantilevers is found it can be assigned a value of "zero" or "one" and, if absent, it can take the opposite value. One way to create a "zero" is to remove or not provide a cantilever corresponding to the frequency to be searched for. Another way would be to destroy the magnetic or mechanical properties of the cantilever. Such a multibit tag having such a code is sometimes referred to as a programmed or personalized tag.

Other methods of interrogating the tags include applying a set of magnetic frequencies corresponding to the resonating frequencies in a "chirp" or multiplexing fashion to cause each resonator present within the tag to vibrate in a temporal sequence. Alternatively, the excitation fields can be acoustic in nature, i.e., sound field, and the detection for both methods of excitation can be acoustic or magnetic. The frequencies can be applied by frequency generators coupled to the excitation device (e.g., speakers, AC excitation coil, and/or AC and DC excitation coil).

Figure 4:
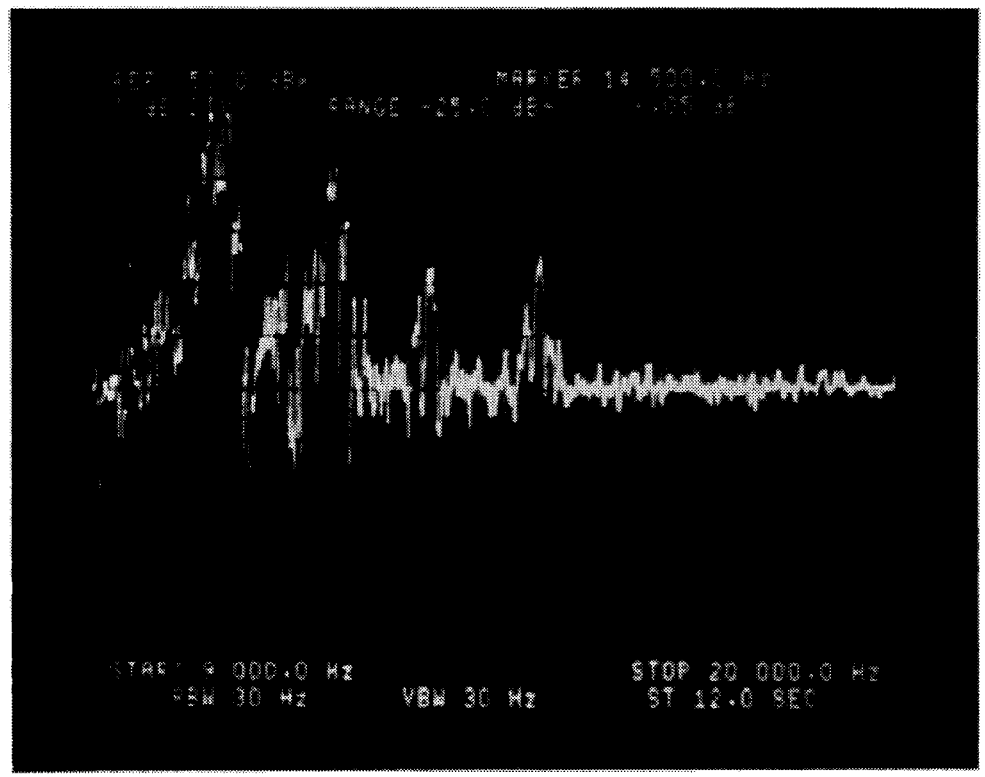
FIG. 4 illustrates the output of a frequency analyzer showing the acoustic response of a multibit tag to a chirped or frequency swept magnetic field.

FIG. 4 shows the output of a frequency analyzer resulting from the excitation of a multibit tag made with an array of bimorph cantilevers of different lengths. Here the tag is excited magnetically by a field chirped between 9 and 20 kHz, and detected acoustically.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A magnetic tag for being remotely sensed, comprising:
   at least one magnetostrictive strip fixedly mounted on a bar of material to form at least one bimorph for being excited in an oscillatory field,
   each said at least one bimorph responding to the oscillatory field by vibrating in a bending mode perpendicular to the plane of the interface formed by said at least one magnetostrictive strip mounted on said bar of material, to produce a unique time varying acoustic or magnetic field when said excitation has a frequency corresponding to a resonant frequency of said bar of material.

2. A magnetic tag as in claim 1 in which the excitation is acoustic.

3. A magnetic tag as in claim 1 in which the excitation is magnetic.

4. A magnetic tag as in claim 1 wherein said bar of material is a hard magnetic material.

5. A magnetic tag as in claim 1 wherein said bar of material is a non-magnetic material.

6. A tag as in claim 4 or 5 wherein said at least one bar of hard magnetic or non-magnetic material of at least one bimorph has first and second ends and wherein one of said first or second ends is clamped thereby forming a cantilever.

7. A magnetic tag as in claim 4 or 5 wherein said at least one bar of hard magnetic or non-magnetic material of at least one bimorph element has first and second ends and wherein both of said first and second ends are clamped or unclamped.

8. A magnetic tag as in claim 1 wherein said at least one bimorph comprises a bar having predetermined fundamental and overtone frequencies, said frequencies being determined by dimensions, material properties and boundary conditions of said bar, said response causing a change in the permeability and thus in the magnetic field of the magnetostrictive strip of said bimorph, said change being detected as a magnetic signal in a pickup coil.

9. A magnetic tag as in claim 1 where said at least one bimorph comprises a bar having predetermined fundamental and overtone frequencies determined by dimensions, material properties and boundary conditions of said bar, said response causing mechanical vibrations, said vibrations causing an acoustic field for detection by one or more microphones.

10. A multibit tag comprising a plurality of claim 1 tags.

11. The multibit tag of claim 10, wherein said tag is coded.

12. The multibit tag of claim 11, wherein said code is binary.

13. A magnetic tag according to claim 1, wherein said at least one magnetostrictive strip is laminated to said bar.

14. A system for identifying an object, comprising:
   a magnetic tag for attachment to said object and for identification of said object upon being interrogated, said magnetic tag including:
      at least one bimorph according to claim 1, said at least one bimorph element having predetermined fundamental and overtone frequencies; acoustic or magnetic means for exciting said magnetic tag thereby to excite said at least one bimorph element to cause said element to mechanically vibrate; and
      acoustic means for detecting the mechanical vibrations of said at least one bimorph element.

15. A system according to claim 14, further comprising means for receiving an output from said means for detecting, and for decoding said output, thereby to identify said object.

16. A system according to claim 14, wherein said at least one bimorph element includes a magnetostrictive strip laminated to a bar.

* * * * *